United States Patent [19]
Anderson

[11] Patent Number: 5,619,711
[45] Date of Patent: Apr. 8, 1997

[54] METHOD AND DATA PROCESSING SYSTEM FOR ARBITRARY PRECISION ON NUMBERS

[75] Inventor: William C. Anderson, Austin, Tex.

[73] Assignee: Motorola, Inc., Schaumburg, Ill.

[21] Appl. No.: 267,740

[22] Filed: Jun. 29, 1994

[51] Int. Cl.$^6$ ................................................. G06F 15/00
[52] U.S. Cl. ......................... 395/800; 395/417; 364/706; 364/716
[58] Field of Search .................................. 395/800, 700, 395/600, 417; 364/706, 716

[56] References Cited

U.S. PATENT DOCUMENTS

| | | | |
|---|---|---|---|
| 4,180,854 | 12/1979 | Walden et al. | 364/706 |
| 4,667,290 | 5/1987 | Goss et al. | 395/700 |
| 4,912,629 | 3/1990 | Shuler, Jr. | 395/600 |
| 4,922,414 | 5/1990 | Holloway et al. | 395/417 |
| 4,989,134 | 1/1991 | Shaw | 395/600 |
| 5,241,491 | 8/1993 | Carlstedt | 364/716 |

OTHER PUBLICATIONS

"BigNum: Un Module Portable Et Efficace Pour Une Arithmetique a Precision Arbitraire," Programme 1; Institut National de Recherche en Informatique et en Automatique; Apr. 1989.

"A Design of General Purpose Number–Theoretic Computer," ICS '88; 3rd Int'l Conference on Supercomputing Proceedings, vol. 2.

Primary Examiner—Alyssa H. Bowler
Assistant Examiner—John Follansbee
Attorney, Agent, or Firm—Keith E. Witek

[57] ABSTRACT

A data processing system 10 comprises an arbitrary precision number C++ class program code 18, which incorporates arbitrary precision arithmetic. The arbitrary precision number program code 18 resides in a client program 14 and never lose bits of precision by maintaining an internal data structure 16, which holds the data, and by manipulating that data by operators and methods which the program code 18 defines. The program code 18, which is embedded in a client program 14, comprises a method that uses "lazy" storage allocation for transparent data management for the arbitrary precision number in the internal data array 22, a "lazy" arithmetic evaluation for avoiding more costly arithmetic operations, a width method for an optimized significant bit calculation, and a method for efficient determining the number of trailing zeros method for more efficient IEEE floating point math emulation operations.

25 Claims, 6 Drawing Sheets

5,619,711

METHOD AND DATA PROCESSING SYSTEM FOR ARBITRARY PRECISION ON NUMBERS

FIELD OF THE INVENTION

The present invention relates generally to data processing systems, and more particularly, to preserving numerical precision of numbers within a data processing system.

BACKGROUND OF THE INVENTION

Due to the intensive computational features that are implemented in a computer system, the precision of the numbers used in the computations play a very important role in the success of the calculation process. Two common operand formats as established by the IEEE are known as single precision data and double precision data formats. As established by the IEEE P754 binary floating point arithmetic standard, single precision floating point data comprises a mantissa portion, an exponent portion and a sign bit portion. The mantissa portion represents a fraction F and is defined as comprising twenty-three bits plus an implied "1" bit (known as a hidden bit) for a total of twenty-four mantissa bits. The mantissa is thus represented as a value "1.F". The exponential portion in the single precision format comprises eight bits. Double precision floating point data also comprises a mantissa portion, an exponent portion and a sign bit portion. The mantissa portion of double precision data is defined as comprising fifty-two bits plus an implied "1" bit for a total of fifty-three bits. The exponential portion comprises eleven bits. Both data formats have a single bit for the sign bit and both data formats have a predetermined number of allocated bits of precision which are finite in nature. If the resolution (number of bits) of a number exceeds fifty-three bits, precision is usually lost using this format.

Furthermore, the maximum precision of numerical types on computer systems is typically the machine word size. Thus, numerical values that exceed the allocated number of bits in a machine word size will be forced to lose bits of precision. Also, certain arithmetic functions will lose bits of precision if the arithmetic functions require more precision than offered by the host computer's word size. For example, when emulating an IEEE-compliant floating point unit or when emulating certain other arithmetic instructions in a microprocessor, one ideally needs to have potentially infinite precision with regard to arithmetic operations in order to achieve 100% accurate results. In addition, if a first floating point number having M significant bits of mantissa is multiplied by a second floating point number having N significant bits of mantissa, a resulting fully-precise mantissa value may have N*M bits of significance. If the N*M bits is larger than a number of bits allocated to the mantissa, then significance is lost/truncated by the system to allow the new mantissa to fit into the appropriately allocated size. In addition, if a very small number is added to a very big number and truncation is forced to occur, the affect of the very small number on the very big number may be lost via the truncation as if the addition never occurred.

As known in the art, implementing infinite precision arithmetic requires extensive use of a memory allocator, resulting in a large overhead which results in slower numerical operations. Due to the difficulty involved in creating a system to perform infinite precision arithmetic, no efficient and useful infinite precision system has been created.

A conventional method called LISP "bignums" requires extensive use of the memory allocator to implement arithmetic computations, for there is no lazy allocation methods or computation documented for performing infinite precision arithmetic in LISP. Furthermore, LISP "bignums" lack special operation for floating point math emulation, which are very essential for performing infinite precision floating point operations.

A "big number package" from GNU g++ compiler also suffers from the same deficiencies found in the previous discussed conventional method referred to as Lisp "bignums". The "big number package" from GNU g++ compiler also requires extensive and wasteful use of a memory allocator, has no "lazy" memory allocation method or computation from inspection of code, and has no special operators for floating point math emulation.

The last known method is a mathematical processing program called dc, which operates under the UNIX environment. The dc program does not support true arbitrary precision, for it stops at a fixed number of digits of precision. Furthermore, due to the lack of intelligent numerical functions that allow the processing of multiple bits at a time, the dc program must perform arithmetic a digit at a time, which degrades the operational efficiency and processing speed of numerical operations.

In general, an efficient and useful infinite precision system has not been developed to date.

SUMMARY OF THE INVENTION

The previously mentioned disadvantages are overcome and other advantages achieved with the present invention. In one form, the present invention comprises a data processing system having an execution device, a memory unit, and a hardware operations unit. The execution device is used in controlling the operation of the data processing system. The memory unit, which is coupled to the execution device, is used for storing numbers within the data processing system, where each number stored within the memory unit is initially assigned a predetermined number of binary memory locations within the memory unit for storing a binary value. The hardware operations unit is used for performing mathematical operations using the numbers stored within the data processing system, where the mathematical operations performed by the hardware operations unit selectively changes a number of significant bits of at least one number stored within the memory unit.

In another form, the invention comprises a dynamic memory controller which has a medium for allocating, medium for changing, and a medium for dynamically expanding. The medium for allocating is used for allocating a predetermined size of memory space to a number. The medium for changing is used for changing a numerical precision of the number, so that the number can no longer be stored in the predetermined size without first reducing the numerical precision. The medium for dynamically expanding is used for dynamically expanding the predetermined size of the memory space allocated to the number to allow the numerical precision of the number to be completely stored in the memory space regardless of any change in the precision of the number over time.

In yet another form, the invention comprises a storage device having a plurality of storage locations, which has a medium for allocating, a medium for changing, and a medium for dynamically expanding. The medium for allocating is used for allocating a predetermined size of memory space to a number. The medium for allocating is stored in a first portion of the storage device. The medium for changing is used for changing a numerical precision of the number, so that the number can no longer be stored in the predetermined size without first reducing the numerical precision. The medium for changing is stored in second portion of the storage device. The medium for dynamically expanding is used for dynamically expanding the predetermined size of the memory space allocated to the number, in which to allow the numerical precision of the number to be completely stored in the memory space regardless of any change in the precision of the number over time. The medium for dynamically expanding is stored within a portion of the storage device.

In yet another form, the invention comprises a method for preserving numerical precision of numbers within a data processing system wherein the data processing system has access to a memory storage unit having L total storage locations. The method begins by assigning a predetermined number M of storage locations within the memory storage unit to store a system number which is used by the data processing system. The M is a finite positive integer less than L. An operation is performed on the system number to change the system number from a first value to a second value which is different from the first value. The second value requires more numerical precision in order to maintain full precision than the first value. The number of storage locations M is expanded within the memory unit to a predetermined number N of storage locations wherein N is greater than M and allows the system number to maintain full precision. The N is a finite positive integer less than or equal to L.

The present invention will be more clearly understood from the detailed description below in conjunction with the accompanying drawings.

Figure 1:
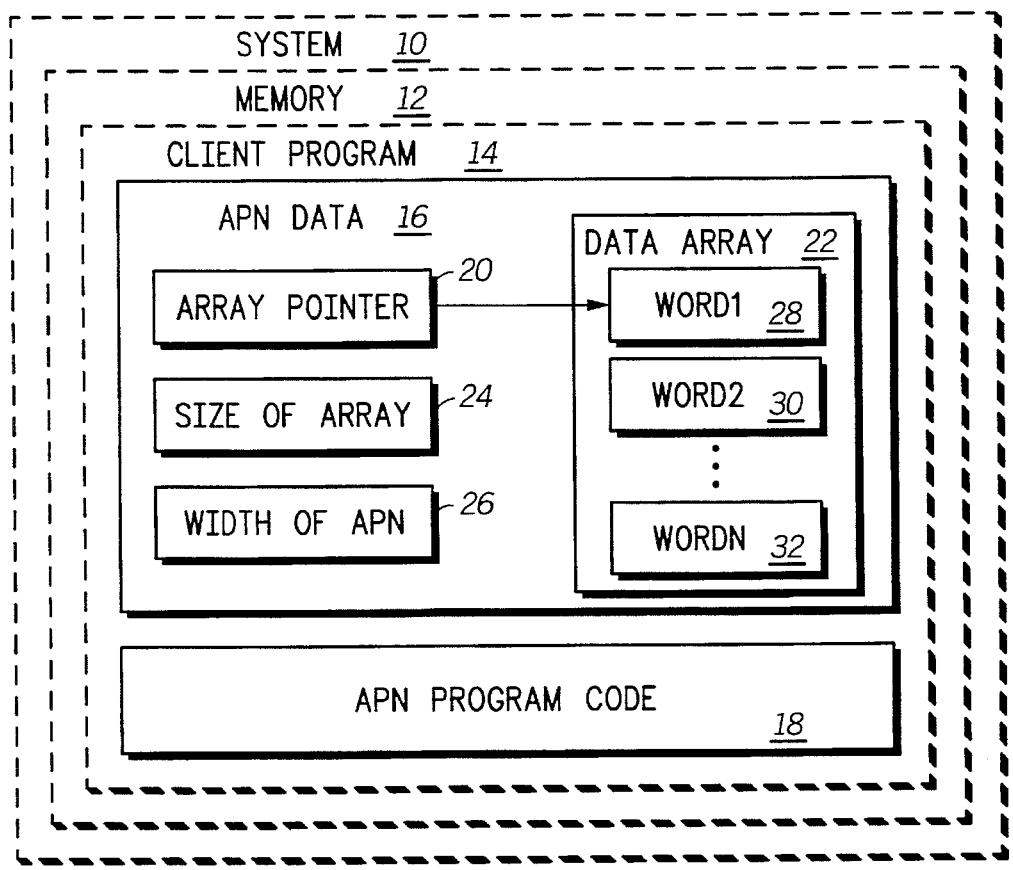
FIG. 1 illustrates, in a block diagram, a data processing system comprising a memory, a client program, an arbitrary precision number data structure, and an arbitrary precision number program code in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

The present invention overcomes many of the disadvantages stated in the above background and can be more fully understood with the reference to the FIGS. 1–7 herein.

Generally, the present invention employs a method for implementing infinite precision binary arithmetic within a data processing system. The data processing system performs calculations on input operands to form output results wherein each of the input operands and the output results have an arbitrary degree of bit precision which is determined by each of the input number(s), and the type of arithmetic operation performed. The data processing system has access to a memory storage unit residing in system storage memory, which stores an arbitrary precision number (APN) data structure, for operands and results, as a data pointer which points to a contiguous block of storage locations, where each storage location is a machine word size (typically 32 or 64 bits long, but may be other sizes).

The memory storage unit of the data processing system includes not only the arbitrary precision number (APN) data structure, but also includes an arbitrary precision number code. The arbitrary precision number code contains instructions for manipulating the internal arbitrary precision number (APN) data structures of operands and results. These instructions for manipulating APNs and operating on APNs include performing lazy storage allocation and/or expansion, lazy arithmetic evaluation, determining width significant bits of an APN in an efficient manner, determining size of memory allocated to an APN in an efficient manner, and calculating the number of trailing (least significant) zeros in an APN.

By using the instructions embedded in the arbitrary precision number code, one can easily construct and perform efficient and portable arbitrary precision arithmetic operations without sacrificing performance. Furthermore, the source code using APNs is substantially unchanged from source code using conventional fixed length data types.

FIG. 1 illustrates a layout of the arbitrary precision number (APN) data fields within a data processing system 10. System 10 may be a computer system, a supercomputer, a mainframe, a processor, or the like. A memory 12 is part of the system 10 and is illustrated in FIG. 1. Memory 12 may be a random access memory (RAM), a fast static random access memory (FSRAM), a dynamic random access memory (DRAM), an erasable programmable read only memory (EPROM), an electrically erasable programmable read only memory (EEPROM), a flash device, a magnetic storage device, a disk storage device, a combination of memory devices, and/or the like. A client program 14 is illustrated in FIG. 1 as residing in the memory 12. The client program 14 is a set of instructions that are written by the user in the C++ language. However, the program 14 can be written in any high level language (such as C, LISP, PASCAL, FORTRAN, and the like).

An arbitrary precision number (APN) data structure 16 resides within the client program 14. The arbitrary precision number data structure 16 has an array pointer 20 that points to a data array 22. Data array 22 is a contiguous block of memory that is allocated to hold a predetermined amount N of machine word memory blocks 28, 30, and 32 that holds the data bits of the arbitrary precision number (APN). For example, if N=32 and a machine word size for each of the N words is 32 bits, then the APN stored via data array 22 has 32×32=1024 total bits of possible precision. The number of machine words N for each APN in the system is variable to allow for dynamic, efficient, and complete precision of each APN in the system 10. The data bit is a single binary digit containing a 0 or a 1, which is typically the smallest possible amount of digital information stored in system 10.

Although, a plurality machine word memory blocks 28, 30, and 32 are illustrated in FIG. 1, the number N of machine word memory blocks is dependent on the precision required by the arbitrary precision number (APN) represented via pointer 20. N can be any finite integer greater than or equal to zero. Expansion and reduction of machine words in array 22 may be linear (i.e. increase or decrease data machine words by 32 words at a time). In this case the data array will comprise 32 words or some multiple of 32 words such as 2720 data words and cannot contain 33 words. The expansion and reduction of APN bits may be done in a word-by-word or bit-by-bit basis. An exponential expansion/reduction can occur. For example, assume an APN has 10 words assigned to it, and through processing in system 10 the APN needs more words to remain fully precise (i.e. in order to lose no bit precision). The array 22 is then expanded to 100 words. More computation then results in further expansion being required and expansion jumps to 1000 words, etc. This exponential expansion may be changed to logarithmic expansion or any other mathematical type of reduction and expansion of bits in the array 22 as needed.

A simple example of allocation is provided here. Assume that one machine word memory block will hold the arbitrary precision number (APN) with no loss of precision, and therefore only one machine word memory block is allocated in the data array 22. Once the precision of the arbitrary precision number (APN) represented via data array 22 exceeds the allocated number of bits provided in array 22 (i.e., one word), then a new expanded contiguous block of memory words 22' (not illustrated) having 2 or more words is created in memory 12 to hold all the data bits for the new expanded arbitrary precision number (APN). The array pointer 20 is changed to point to the new array 22' and the APN is copied into array 22' with full precision due to the fact that array 22' has more words than old array 22. The old array 22 is destroyed (deallocated) and the APN continues infinite processing via the new and/or larger array 22'.

In another form, word1 28 of FIG. 1 is simply a number of contiguous bits operated upon or considered by the hardware as a group. If the arbitrary precision number (APN) expands beyond the limit of the word1 28, then space for a word2 30 is allocated and added to the data array 22. FIG. 1 illustrates that the data array 16 can expand up to a wordN 32, which is determined by the maximum virtual memory size of the hardware, which is defined to be equal to or greater than the maximum physical memory size of the memory unit 12 within the system 10. In general, the storage words from word 1 to word N may allow for an APN which has millions of bits of storage and therefore millions of bits of digit precision. The expanded arbitrary precision number (APN) is allocated more bits by an arbitrary precision number program code 18.

A size of array 24, which is a data type embedded in the arbitrary precision number (APN) data structure 16, has a value that indicates the number of machine word memory blocks contained in the data array 22. For example, if N equals 32 in FIG. 1 then the element referred to as size of array 24 is set to the value 32 in FIG. 1 to denote that 32 words are allocated to the APN stored via array 22. The size element 24 may store a size value in terms of bits, bytes, words, longwords, or any other binary or numerical size.

A width data type 26, which is embedded within the arbitrary precision number (APN) data structure 16, has a value that indicates the number of actual bits within the arbitrary precision number (APN) (i.e. array 22), which are used to represent a numeral. For example, the binary for decimal number 5 is equal to 101 and has 3 digits. The number of bits used to store an APN is precisely given by the mathematical formula: floor($\log_2$(APN)). Therefore, if decimal 5 is stored in the data array 22, the value in element 26 of FIG. 1 is three denoting that the value stored in array 22 needs 3 bits of significance in order to remain fully precise. In general, element 26 stores how many bits of significance are used to represent an APN in array 22. When the array pointer 20 is altered to point to a new contiguous group of machine word memory blocks, is expanded, or is altered in numerical value, both the size of array 24 and the width of the arbitrary number 26 are also updated to reflect the new allocated memory change. For example, if the data array 22 was increased by one machine word memory block, then the size of array 24 would increase by one and the width of the arbitrary precision number stored in element 26 would increase to reflect the change in the number of bits used to store the APN in array 22. To give a summary example, if 6 words were assigned to array 22, element 24 would store 6 (i.e., 110 in binary). In another form, if a word size was 32 bits, element 24 could store 192 bits. Furthermore, if the APN is stored in array 22 (which has 6 allocated words) is decimal 1137 (i.e., 10001110001 in binary) then element 26 would store the decimal value 11 meaning that out of the 192 bits in array 22 only 11 are currently being used to represent the APN.

To summarize, FIG. 1 illustrates a data structure wherein a pointer 20 points to an expandable array 22. The expandable array 22 holds an APN which is a number wherein numerical significance is not lost as long as there is machine memory in memory 12 that can be used to expand array 22 as the precision of the APN increases. A size 24 records the allocated size of array 22 is some binary unit (i.e., bit, word, etc.), and a width field 26 records how may bits in array 22 are actually used to store the APN number. By using FIG. 1, numbers may be represented in a computer wherein the numbers do not lose numerical precision and computations on the numbers are made in a more efficient manner.

Figure 2:
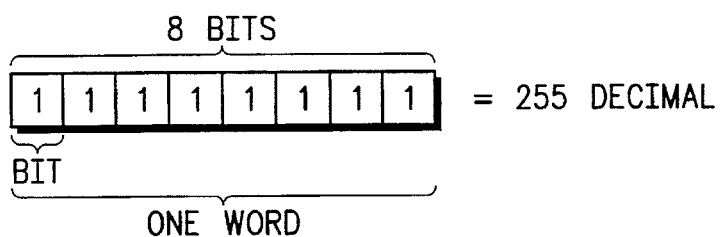
FIG. 2 diagrammatically illustrates, a bit pattern for a machine word memory block in accordance with the present invention.

FIG. 2 illustrates a machine word memory block, which has the same data structure definition as word1 28 in FIG. 1. The machine word memory block illustrated in FIG. 2 contains eight individual locations that represent bit storage locations to store bits. Each individual bit storage location stores one bit as illustrated in FIG. 2. Also, all eight bits for this particular system 10 represents one word, which as previously mentioned above, is simply a number of contiguous bits operated upon or considered by the hardware as a group. Furthermore, each individual bit has a logic value of one in FIG. 2, and therefore the binary value of the machine word memory block in FIG. 2 is 11111111 in binary, which is equivalent to the decimal value of 255. The machine word memory block in FIG. 2 represents the arbitrary precision number 255 and is stored in an arbitrary precision number (APN) data structure in the same manner as the arbitrary precision number 16 in FIG. 1. However, the data structure for the arbitrary precision number 255 of FIG. 2 would have an array pointer that points to a data array that only contains one machine word memory block and not N blocks as illustrated in FIG. 1. This one machine word memory block included in the array is illustrated in FIG. 2.

Figure 3:
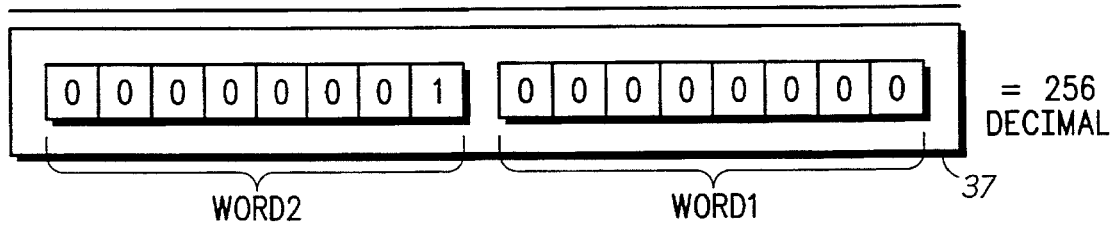
FIG. 3 diagrammatically illustrates, an addition operation using two different bit patterns as operands in accordance with the present invention.

FIG. 3 illustrates a result of an addition operation performed on two arbitrary precision numbers (APNs) that both have the same bit data structure as the machine word memory block in FIG. 2. In FIG. 3, a machine word memory block 34 is a first operand, which has a binary value of 11111111 and a decimal value of 255, and a machine word memory block 36 is a second operand, which also has a binary value of 00000001 and a decimal value of 1. The addition operation is being performed on both the first and second operands in FIG. 3. The first and second operands, which are APNs, are added together in FIG. 3 and stored in an APN result. Since, the result of the operation performed in FIG. 3 has a decimal value of 256, which is a binary value of 100000000 and greater than the 8-bit machine word memory block, the data result must expand beyond one memory word. The data array used to store the result initially has only one machine word memory block allocated. Therefore, the data array for the result, which has the same data structure definition as array 22 in FIG. 1, must be expanded by adding a second machine word memory block to the array. The values of the width and the size (i.e., elements 24 and 26) which correspond to the result of decimal value 256 are updated to denote the change in value and the expanded array structure. The array pointer in the data structure for the 256 decimal result will point to a data array which has two machine word memory blocks. FIG. 3 also illustrates that the first machine word block will have the value of 00000000 and the second machine word block will have a value of 00000001, therefore when treated as an contiguous group of bits, the result will have a binary value of 0000000100000000, which is 256 in decimal. As previously stated, the data structure that contains the width of result has the same data structure definition as illustrated in the width of the arbitrary precision number 26 in FIG. 1 and is also updated within the data structure for the result during reallocation and/or expansion of the array. The memory allocation and expanding of the size of the array, the managing of the width field for the result, and the array pointer alterations are all controlled by the machine instructions embedded within the arbitrary precision number program code 18 as illustrated in FIG. 1.

Figure 4:
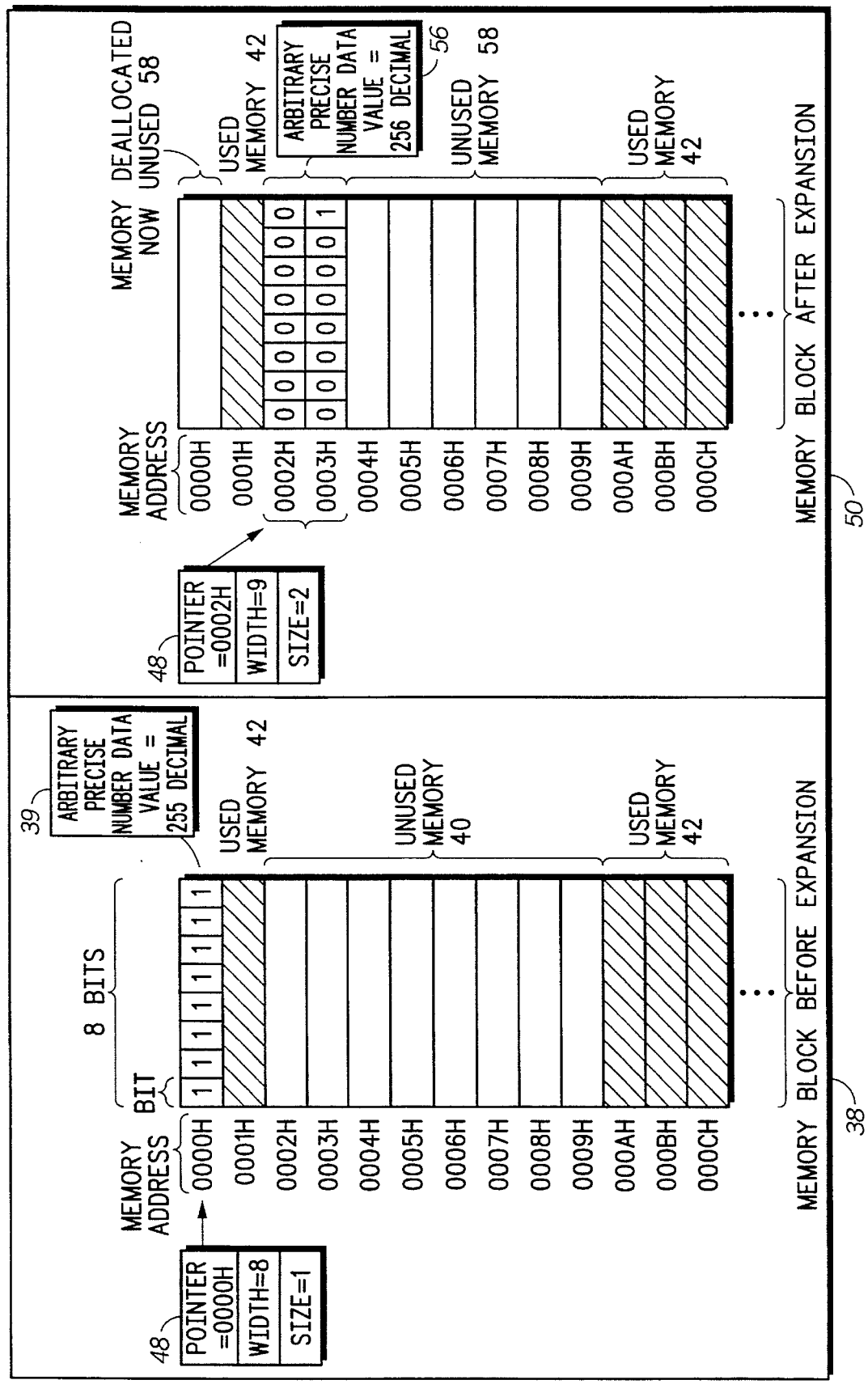
FIG. 4 diagrammatically illustrates, example memory blocks in a digital system before and after an arbitrary precision number, whose numerical value and data structure is defined in the embodiment of FIG. 1, undergoes precision expansion in accordance with the present invention.

FIG. 4 illustrates an example memory block 38 in a digital system before the arbitrary precision number (APN) expands. An array pointer 20 in FIG. 1 points to previously unused contiguous memory blocks in order to store an APN. In FIG. 4, the machine word memory block 38 is used to store the value of an arbitrary precision number that has a value of 255 decimal in the addressable location 0000H. The machine word 39 has the identical data structure and value as the machine word memory block illustrated in FIG. 2. A partial arbitrary precision number (APN) data structure 48 comprises an array pointer, a width data structure, and a size data structure. The array pointer in APN data structure 48 is pointing to a memory address 0000H (0000 hexadecimal) wherein the value of 255 decimal is stored as an expandable APN. The address 0000H denotes the memory address zero in hexadecimal. The width data structure in APN data structure 48 stores the number of significant bits that the arbitrary precision number (APN) needs in order to store the value of the arbitrary precision number. Since it takes eight significant bits to store the binary number 11111111, which is 255 in decimal, the width data structure in the APN data structure 48 has a value of eight. The size data structure in the APN data structure 48 stores the number of machine words that the arbitrary precision number needs in order to store the value of the arbitrary precision number. Since it takes eight bits to store the binary number 11111111, which is 255 in decimal, and if one machine word is equal to eight bits, then the size data structure in APN data structure 48 has a value of one.

Two used memory blocks 42 are already allocated for another process/purpose, where the used memory blocks 42 are also contiguous blocks of machine word memory blocks and occupy memory addresses 0001H, 000AH, 000BH, and 000CH. Blocks 42 indicate space assigned to, for example, other APNs in the system. An unused memory block 40 is also a contiguous block of machine word memory blocks and occupies memory addresses from 0002H to 0009H. It should be noted that the addresses in FIG. 4 may begin at any address in physical or logical memory (not just 0000H).

In addition, FIG. 4 illustrates a block 50 which is the example memory block 38 after the arbitrary precision number (APN) in memory word 39 is expanded by one machine word memory block due to the addition illustrated in FIG. 3. As a result of the expansion/addition from FIG. 3 of the APN in word 39, the machine word memory block 39 needs another contiguous machine word memory block in order to store the APN with full precision. However, the memory address location 0001H is in use by another process, APN, value, or data structure. Therefore, in block 50, the array pointer in the APN data structure 48 is changed to point to an address 0002H so that the contiguous memory blocks addressed as 0002H and 0003H may be used to store the new expanded APN since that APN no longer fits in 0000H and since 0000H cannot be expanded in a contiguous manner. In addition, the width and size data structures in the APN data structure 48 are updated. The width data structure has a value of nine, for it takes nine significant bits to hold 100000000, and the size data structure has a value of two, for it takes two words to hold 100000000 in a system having 8-bit words. Contiguous memory block 56 having the addresses of 0002H and 0003H is illustrated in block 50 as being the new APN location. For further example, if the memory block 50 was used to store the result APN 37 in FIG. 3, which contained two machine word memory blocks, word1 in FIG. 3 would be stored in memory address 0002H in FIG. 4 and word2 in FIG. 3 would be stored in memory address 0003H in FIG. 4. The configuration and storage position of least significant words and most significant words may vary from machine to machine. After the expansion, unused/deallocated memory portions 58 in block 50 now occupies addresses 0000H, from 0004H to 0009H. Used memory 42 in block 50 occupies the same address locations as the used memory 42 in block 38 and remains unchanged by the APN expansion.

In general, the easiest way to store APNs so that processing arithmetic is simple is by allocating only contiguous blocks of memory to an APN. This continuous expansion by allocating new memory and deallocating old memory may result in memory fragmentation although limited use of APNs in a system do not cause severe fragmentation. To avoid fragmentation, a linked list type of allocation may be used for the array 22 of FIG. 1 thereby removing the requirement that memory be contiguous. This method, although potentially more fragmentation-free complicates mathematical processing on an APN since the APN binary digits could be spread all over physical memory. Furthermore, copying of an APN to new memory area is more complex for linked list structures, and memory overhead for linked list structures is usually greater than contiguous arrays of memory due to the added overhead of additional pointers.

It should be noted that FIG. 4 is illustrative only and is simplified. Actual memory allocation is more complex and varies from machine to machine.

Figure 5:
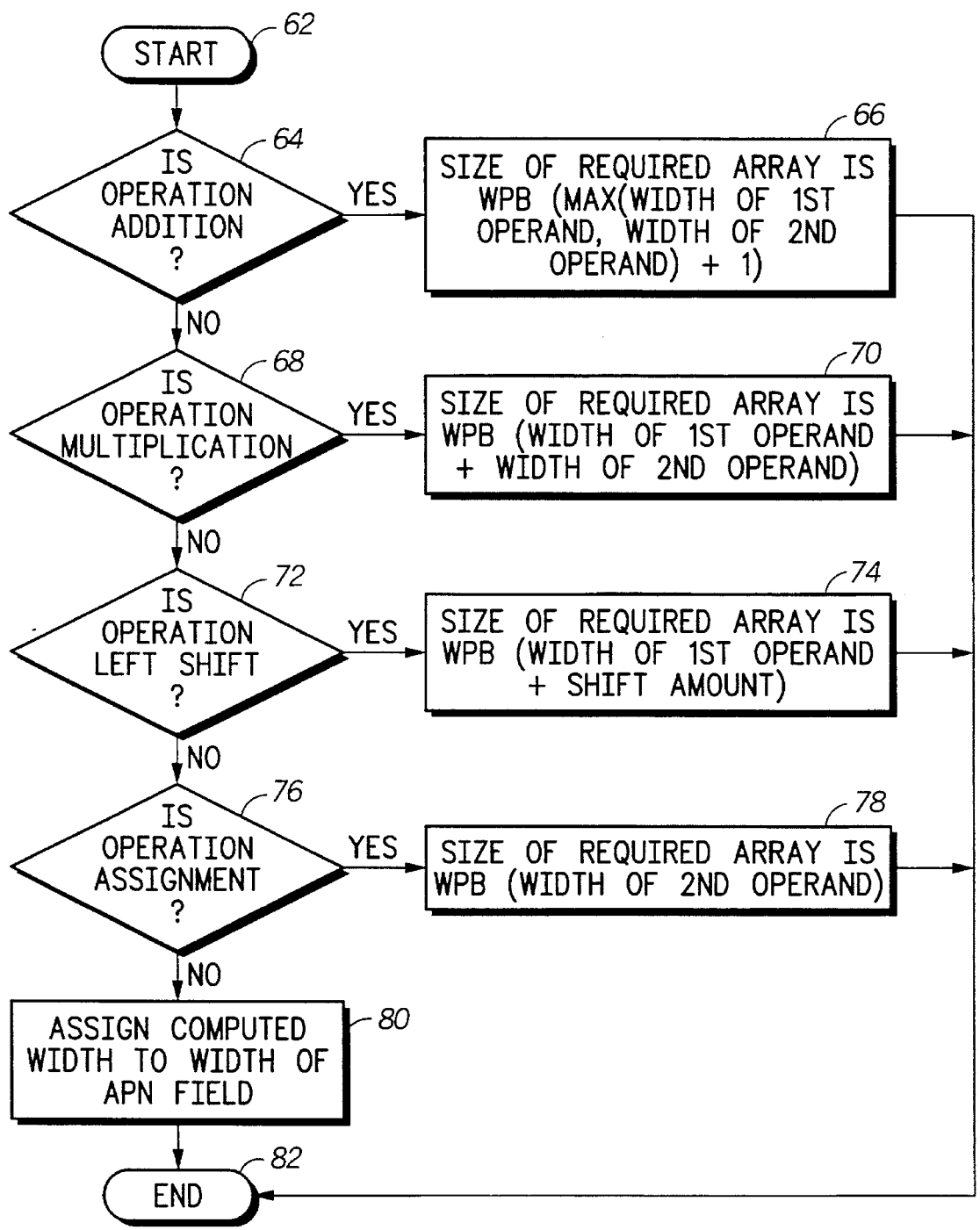
FIG. 5 illustrates, in a flowchart, an algorithm for implementing lazy memory allocation in accordance with the present invention.

FIG. 5 illustrates the algorithm for determining memory storage and expansion requirements for performing numerical operations on arbitrary precision numbers. In general, the expansion algorithm used for the APNs is a lazy expansion method wherein the APN array is expanded upon need but is not reduced automatically. For example, if a APN is expanded to 10 words and subsequent to this expansion can be reduced to 5 words, this reduction is not made automatic but is a user option. The reason for not making reduction automatic is that the reduction of APN allocated space takes time. Experimentation has shown that if an APN is expanded to 4 words, then the chances that the APN will need these 4 words in the future is high even if precision in the interim reduces such that the APN can be represented in 2 words. Therefore, experimentation has shown that reduction of APNs in an automatic manner to save space results in a time degradation that is not the desired trade-off for the preferred embodiment. Therefore, lazy allocation which does not reduce an expanded APN unless specifically instructed by a user is implemented. The user can initiate the reduction of APN allocated space through execution of a computer instruction located in a user/client computer program.

In FIG. 5, a step 62 begins the process for determining memory storage requirements for numerical operations performed on arbitrary precision numbers (APNs). A step 64 checks if operation is addition. If the operation in the step 64 is addition then a step 66 is executed, else a step 68 is executed. The step 66 calculates the size of the required result APN array by finding the maximum width between the first operand and the second operand and adding a value of one to this maximum width. The step 66 will therefore yield the number of bits needed to hold any possible value of the arbitrary number result after addition. Once the number of maximum bits needed is known, then the number of machine word memory blocks to hold the value of the arbitrary precision number can be determined by using the formula WPB(N)=((N−1)/BPW)+1, where WPB is the number of words per bits, BPW is the number of bits per machine word, and N is the maximum of bits needed to perform an operation in the step 66.

For example, in FIG. 3 an addition operation is performed on operand 34 (a one-word APN) and operand 36 (a one-word APN), and each operand is a machine word memory block that only holds eight bits. Using the rule stated above, the maximum bit-width between operands 34 and 36 is eight, because operand 34 has the binary value 11111111 and the binary value occupies all eight bits in the machine word memory block for the operand 34. Therefore, the maximum amount of bits that the result can contain is eight plus one, which is nine bits (as illustrated via result 37). Thus, FIG. 3 illustrates that the result 37 contains nine significant bits and the number of machine word memory blocks needed to hold nine significant bits is two words. After the size of the required array is calculated by the arbitrary precision number (APN) program code 18 in the step 66, flow continues to a step 82.

The step 68 checks if the operation is multiplication. If the operation in the step 68 is multiplication, then a step 70 is executed, else a step 72 is executed. The step 70 calculates the maximum size of the required array by adding the width of the first operand with the width of the second operand, which will yield the maximum number of bits needed to hold the value of the arbitrary number result after multiplication. Once the number of bits required for a resulting APN is known, then the number of machine word memory blocks to hold the value of the arbitrary precision number (APN) result can be determined by using the formula WPB(N)= ((N−1)/BPW)+1, where WPB is the number of words per bits, BPW is the number of bits per machine word, and N is the maximum of bits needed to perform an operation in the step 70. For example, if each operand is a machine word memory block that only holds eight bits and operand one has a binary value of 11111111 (eight bits) and operand two also has a binary value of 11111111 (eight bits), then when multiplied, the resulting value would have a binary value of 1111111000000001, which is a total of sixteen bits. The maximum possible width of the multiplied result can be predetermined by using the rule stated above, which is adding the widths of both operands one and two to result in a maximum possible result width. Therefore two 8-bit machine word memory blocks would be needed to hold the resulting multiplied value. After the size of the required result array is calculated by the arbitrary precision number program code 18 in the step 70, flow continues to the step 82.

The step 72 checks if the operation is a left shift; if the operation in the step 72 is a left shift, then a step 74 is executed, else a step 76 is executed. The step 74 calculates the maximum size of the required array by adding the width of the first operand and the shift amount, which will yield the maximum number of bits needed to hold the value of the arbitrary number shifted result. Once the number of result bits required is known, then the number of machine word memory blocks to hold the value of the arbitrary precision number result can be determined by using the formula WPB(N)=((N−1)/BPW)+1, where WPB is the number of words per bits, BPW is the number of bits per machine word, and N is the maximum of bits needed to perform an operation in the step 74. For example, if each operand is a machine word memory block that only holds eight bits and operand one has a binary value of 11111111 and operand one is shifted left two times, then after being shifted left two time the resulting value would have a binary value of 1111111100. The resulting value of 1111111100 has a total of ten significant bits and by using the rule stated above, can be predetermined by adding the operand one bit-width and the shift amount, which is two, to yield a result of ten significant bits. Therefore two machine word 8-bit memory blocks would be needed to hold the resulting value. After the size of the required array is calculated by the arbitrary precision number program code 18 in the step 74, flow continues to the step 82.

Right shifts are not detected in FIG. 5 since right shifts only reduce the number of bits in an APN, and reduction is not automatically performed due to the optimal lazy expansion method discussed above.

The step 76 checks if the operation is an assignment. If the operation in the step 76 is an assignment, then a step 78 is executed, else a step 80 is executed. The step 78 calculates the maximum size of the assigned variable in the assignment statement by assigning the assigned variable (left side in A=B) of the assignment operation the width of the second operand (right side in A=B). This assignment of B's size to A's size will yield the maximum number of bits needed to hold the resulting A value of the arbitrary precision number (APN). Once the number of bits needed is known, then the number of machine word memory blocks to hold the value of the arbitrary precision number result A can be determined by using the formula WPB(N)=((N−1)/BPW)+1, where WPB is the number of words per bits, BPW is the number of bits per machine word, and N is the maximum of bits needed to perform an operation in the step 78. For example, if operand B is a machine word memory block that only holds eight bits and operand two has a binary value of 11111111, then since the resulting value is being assigned to operand A, the resulting value A must be able to contain the same number of bits contained in operand B. Therefore, the resulting value would have a binary value of 11111111 for a total of eight significant bits. After the size of the required array is calculated by the arbitrary precision number program code 18 in the step 78, flow continues to the step 82.

The step 80 is executed for all other numerical operations performed with arbitrary precision numbers (APNs). For all other operations, the step 80 calculates the maximum size of the required array by finding the maximum width size between the first operand and the second operand, which will yield the maximum number of bits needed to hold the resulting APN value. For example, if a subtraction operation is performed on operand 34 and operand 36 from FIG. 3, and each operand is a machine word memory block that only holds eight bits. Using the rule stated above, the maximum width between operands 34 and 36 is eight, for operand 34 has the binary value 11111111 and the binary value occupies all eight bits in the machine word memory block for the operand 34. Therefore, the maximum amount of significant bits that the result can contain is eight bits. Subtracting operand two 36 from operand one 34 results in a binary value of 11111110, since the subtraction operation is decreasing the result, the number of significant bits can never exceed eight bits. In the case of signed numbers, a subtraction will result in a number with more precision than previously needed (i.e. 4−(−4)=8). In this case, subtraction is handled like the addition discussed above. Once the number of bits needed to store an arbitrary precision number is known, then the number of machine word memory blocks to hold the value of the arbitrary precision number can be determined by using the formula WPB(N)=((N−1)/BPW)+1, where WPB is the number of words per bits, BPW is the number of bits per machine word, and N is the maximum of bits needed to perform an operation in the step 80. After the size of the required array is calculated by the arbitrary precision number program code 18 in the step 80, flow continues to the step 82. A step 82 exits the "algorithm for determining memory storage requirements" procedure.

Figure 6:
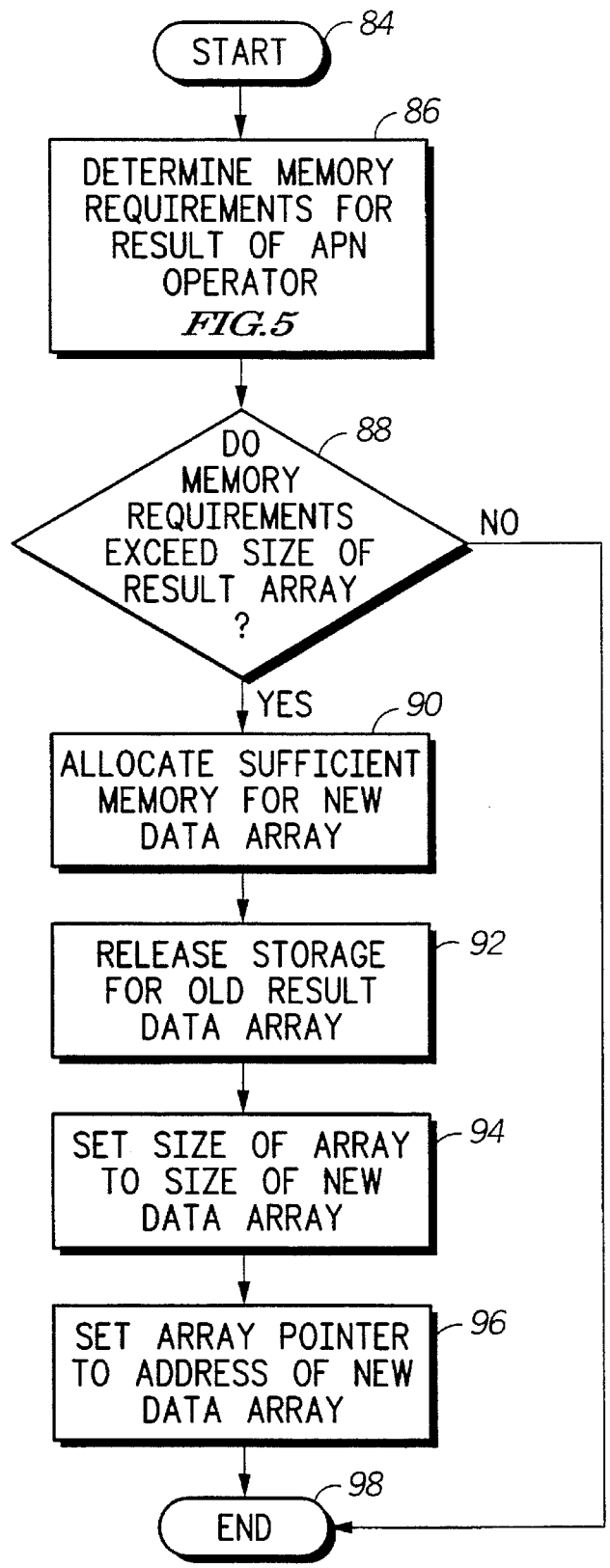
FIG. 6 illustrates, in a flowchart, an algorithm for determining memory storage requirements for a particular operand in accordance with the present invention.

FIG. 6 illustrates an algorithm that performs the "lazy" memory allocation for numerical operations performed on the arbitrary precision numbers. The lazy allocation was briefly introduced above and is further discussed with respect to FIG. 6. A step 84 begins the process for controlling the "lazy" memory allocation scheme for a mathematical operation performed on the arbitrary precision numbers (APNs). A step 86 determines if the arbitrary precision number needs to expand due to the problem of the lack of allocated bits to hold the value of the new arbitrary precision number, which is illustrated in more detail and discussed above in FIG. 5. For example, in FIG. 3, originally the result 37 only contained one machine word, however the result 37 needed to expand to contain two machine word memory blocks to hold the additional bit after the numerical addition operation illustrated in FIG. 3. The process of determining when an arbitrary precision number (APN) needs to expand is controlled by the arbitrary precision number program code 18 in FIG. 1.

A step 88 checks if the memory requirements of the resulting APN exceed the size of the result data array. In step 88, the function WPB(N) which computes the number of words needed to contain N bits is given by the formula ((N−1)/BPW)+1 wherein BPW is bits per machine word and all arithmetic is integer arithmetic. In the WPB function, N is assumed to be non-negative. Step 88 is performed by the arbitrary precision number program code 18 in FIG. 1. In step 88, if the size of the resulting APN does not exceed the size of the allocated size of the result data array, then a step 98 is executed; else, flow continues to a step 90. The step 90 allocates sufficient memory for the new result data array as predetermined via the step 86. For example, in FIG. 3 the result 37 was expanded to contain two machine word memory blocks rather than one memory word, where the arbitrary precision number contiguous memory block 56 was increased to hold the new value of the arbitrary precision number (APN). A step 92 releases storage for the old result data array and any unused space left over from the old APN data structure which is no longer used. For example, in FIG. 3, the pointer 48 in block 38 points to the memory address 0000H to store an old result of some operation, in which the old result only needed one machine word memory block to store the value. However, the new result needs an additional machine word memory block, therefore the pointer 48 in block 50 now points to a different memory location and the memory address space location 0000H is released/deallocated and is considered an unused memory space block.

A step 94 in FIG. 6 sets the size of the data array to the new data array size. Step 94 is executed by the arbitrary precision number program code 18 in FIG. 1. For example, if the arbitrary precision number data array 22 in FIG. 1 increased by one additional machine word memory block, then the arbitrary precision number program 18 executes an instruction that will increase the size of array 24 by one and increase the width of the arbitrary precision number 26 to correctly store the larger number of bits of precision of the APN stored in array 22. A step 96 sets the array pointer to the address of the new data array, which is executed by the arbitrary precision number program code 18 in FIG. 1. For example, in FIG. 3, in order to hold the additional bits allocated to the data array structure 39, the pointer 48 must now point to a new address space location as illustrated via block 50 in FIG. 4. The step 98 exits the "Algorithm for 'lazy' memory allocation" procedure.

Figure 7:
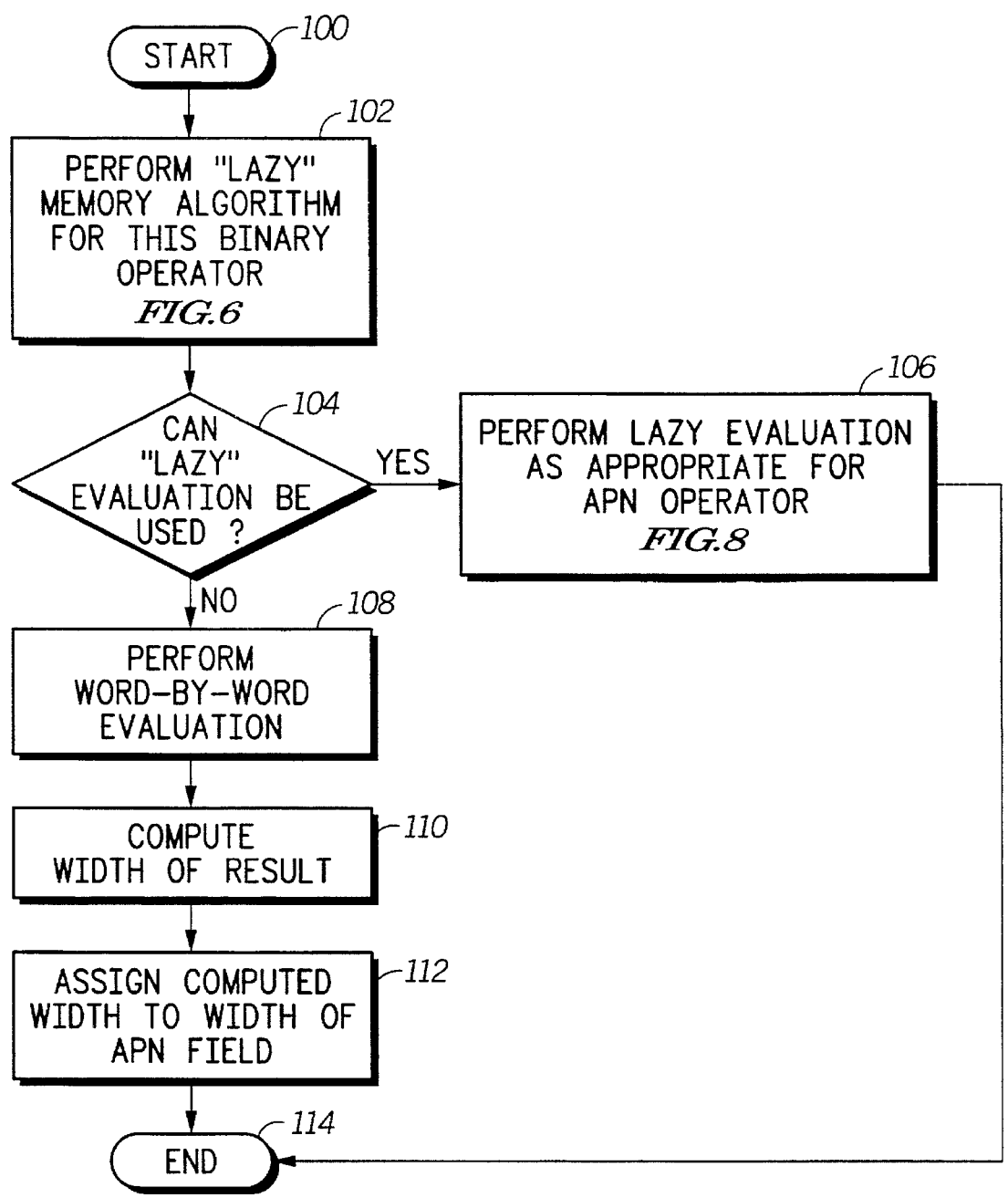
FIG. 7 illustrates, in a flowchart, an algorithm for implementing lazy evaluation in accordance with the present invention.

FIG. 7 illustrates the flow of an algorithm for performing "lazy" evaluation operations on arbitrary precision numbers (APNs). A step 100 begins the process for the "'Lazy' Evaluation Algorithm" procedure. A step 102 evaluates the mathematical expression by detecting what operator is used to calculate the result of the mathematical expression. A step 104 takes the operator that was detected in the step 102 and determines if the operator is an equal operator, a not equal operator, a less than operator, a greater than operator, a less than equal to operator, or a greater than equal to operator. If the operator in the step 102 is found in the step 104, then flow continues to a step 106; else flow continues to a step 108. The step 106 performs a "lazy" evaluation comparison if the widths of the two operands are not equal. For example, when comparing two conventional numbers, a bit-by-bit comparison is made and if one bit position is not equivalent in the two numbers, then the two numbers are not equal. For APNs, if the width fields 26 (which gives the number of bits of precision of an APN) of two compared APNs are not equal then the APNs are not equal in value. Therefore, when the comparison operator is used on APNs and one operand has fewer significant bits than the another operand, then the lazy arithmetic evaluation for the comparison is implemented by comparing the widths of the operands rather than bit-by-bit comparing one or many words in the actual data arrays. This is illustrated via example below (the following example will be termed Example A):

Example A

| Operand One | Operand Two |
|---|---|
| 11111111 | 00001111 |
| significant bits (width) 8 | significant bits (width) 4 |
| allocated words = 1 | allocated words = 1 |

In Example A, since operand one and operand two have different widths, the comparator operator would only need to examine the value of the width data type in the data structure of the arbitrary precision number to determine that the numbers cannot be equal.

Furthermore, assume that two APNs are large numbers having being assigned 32 32-bit words each (for a total of 1024 bits of possible precision). Assume that out of the 1024 possible bits the width value 26 is equal to 1022 for both APNs, since both have the same amount of bits. Because they have the same amount of bits, no determination can be made as to the equality of the two numbers unless a bit-by-bit comparison is started. Assume that the CPU which supports APNs has a 32 bit compare or subtractor unit. This means that to completely bit-by-bit compare the entire APNs, the compare or subtractor unit must execute 32 compares (i.e., one compare for each word in the APNs). These 32 compares can be reduced and improve performance via the use of lazy evaluation. Suppose that during the comparison of the 1st words in the 32 word APNs, a bit is found to be not equal. In this case, no further comparison is needed for the rest of the 31 words since they no longer matter because due to word 1 being unequal, the whole APNs are unequal and the compare operation can stop with a correct answer and improve performance. After the step 106 is exited, flow continues to a step 114. Generally, all operators in the step 104 can be evaluated by using the "lazy" evaluation method as described in the manner previously discussed.

The step 108 takes the operator that was detected in the step 102 and determines if the operator is an addition operator, an addition and assign operator, an incrementor operator, a subtraction operator, a subtraction and assign operator, and a decrementor operator. If the operator in the step 102 is found in the step 108, then flow continues to a step 110; else flow continues to a step 112. The step 110 performs an early exit from the evaluation process chain based on the width of the arbitrary precision operation and the carry-out produced during the evaluation process. Lazy evaluation lets the operator know when to abandon an operation early, as opposed to unnecessarily continuing an operation on many words of null (zero) data or useless data. The following is an example which will be termed Example B:

Example B

Lazy Evaluation Using Addition

|  | word2 | word1 |  |
|---|---|---|---|
| Operand One => | 10000000 | 00000000 | width=16 |
| Operand Two=> | + | 00001111 | width=4 |
| Result => | 10000000 | 00001111 | width=16 |

In Example B the machine word size is assumed to be 8-bits for ease of illustration. In Example B, Operand One is an arbitrary precision number that has a decimal value of 32,768 and therefore requires two words in order to store properly. For Operand One, the binary value 1000000000000000 is equal to the decimal value of 32,768. However, Operand Two in Example B, is an arbitrary precision number (APN) that has a decimal value of 15, and since the machine word size is a maximum of eight bits, only one machine word data memory block is needed to hold the four significant digits. The binary value 00001111 is equal to the decimal value of 15 for Operand Two.

Also, in Example B, the result is an arbitrary precision number (APN) whose maximum possible size is known (see FIG. 5) and whose value is unknown until after the operation performed on Operand One and Operand Two is complete. To calculate the result in Example B, "lazy" arithmetic evaluation for addition is implemented by utilizing the widths and allocated word sizes of the operands A and B which are stored as illustrated for the APN of FIG. 1. First, the CPU determines that the smallest operand in the add is Operand Two, and that Operand Two is only one word long. Therefore, all bits above word1 of Operand Two are effectively zero during the add operation. Therefore, no bits in Operand Two can affect the word2 of the result unless a carry-out results from the additions of the word1 values in the Example B. In Example B, no carry-out results from the addition of the word1 of Operands Ones and Two and therefore the word 2 of Operand One (i.e., 10000000) is copied to the result without the need for an add operation on word2. The Result in Example B has a binary value of 1000000000001111, which is 32,783 in decimal.

The following is Example B':

Example B'

Lazy Evaluation Using Addition

|  | word2 | word1 |  |
|---|---|---|---|
| Operand One => | 10000001 | 11111111 | width=16 |
| Operand Two=> | + | 11111111 | width=8 |
| Result => | 10000010 | 00000000 | width=16 |

In Example B', even though the words allocated to each APN differ in number, a carry-out from the addition of word1 results in the CPU. Therefore the CPU must continue adding word2 through wordN until a carry-out is no longer generated in the CPU. Once the CPU does not have a carry-out of one addition operation, the APN addition can cease and the rest of the longest operand may be copied to corresponding bit positions in the Result.

In a manner similar to "lazy" evaluation using addition, "lazy" evaluation using subtraction can also be performed on arbitrary precision numbers, which is described in the following manner (the following code example will be termed Example C):

Example C

Lazy Evaluation Using Substraction

|  | word2 | word1 |  |
|---|---|---|---|
| Operand One => | 10000000 | 10011111 | width=16 |
| Operand Two=> |  | 00001111 | width=4 |
| Result => | 10000000 | 10010000 | width=15 |

In Example C, word 2 of Operand One can be copied to the Result word2 since no borrow-out from the word1 resulted from the subtraction. In general, subtraction can be lazy evaluated in a manner similar to addition. In a manner similar to "lazy" evaluation using addition and subtraction, "lazy" evaluation can also be performed by using the other operators in the step 108.

The step 112 takes the operator that was detected in the step 102 and determines if the operator is a multiplication operator. If the operator in the step 102 is found in the step 112, then flow continues to a step 113; else flow continues to the step 114. The step 113 avoids partial product generation and addition if either operand has a value of zero or one. In general, multiplies by zero or one, and other operations may be flagged by the code 18 to reduce the wasting of CPU process time, thereby improving APN operational speed and efficiency. Furthermore, a multiply by 2 is simply a shift left by one (which is usually quicker than a multiply), and so on. After the step 113 is exited, then flow continues to the step 114. The step 114 exits the "'Lazy' Evaluation Algorithm" procedure.

Figure 8:
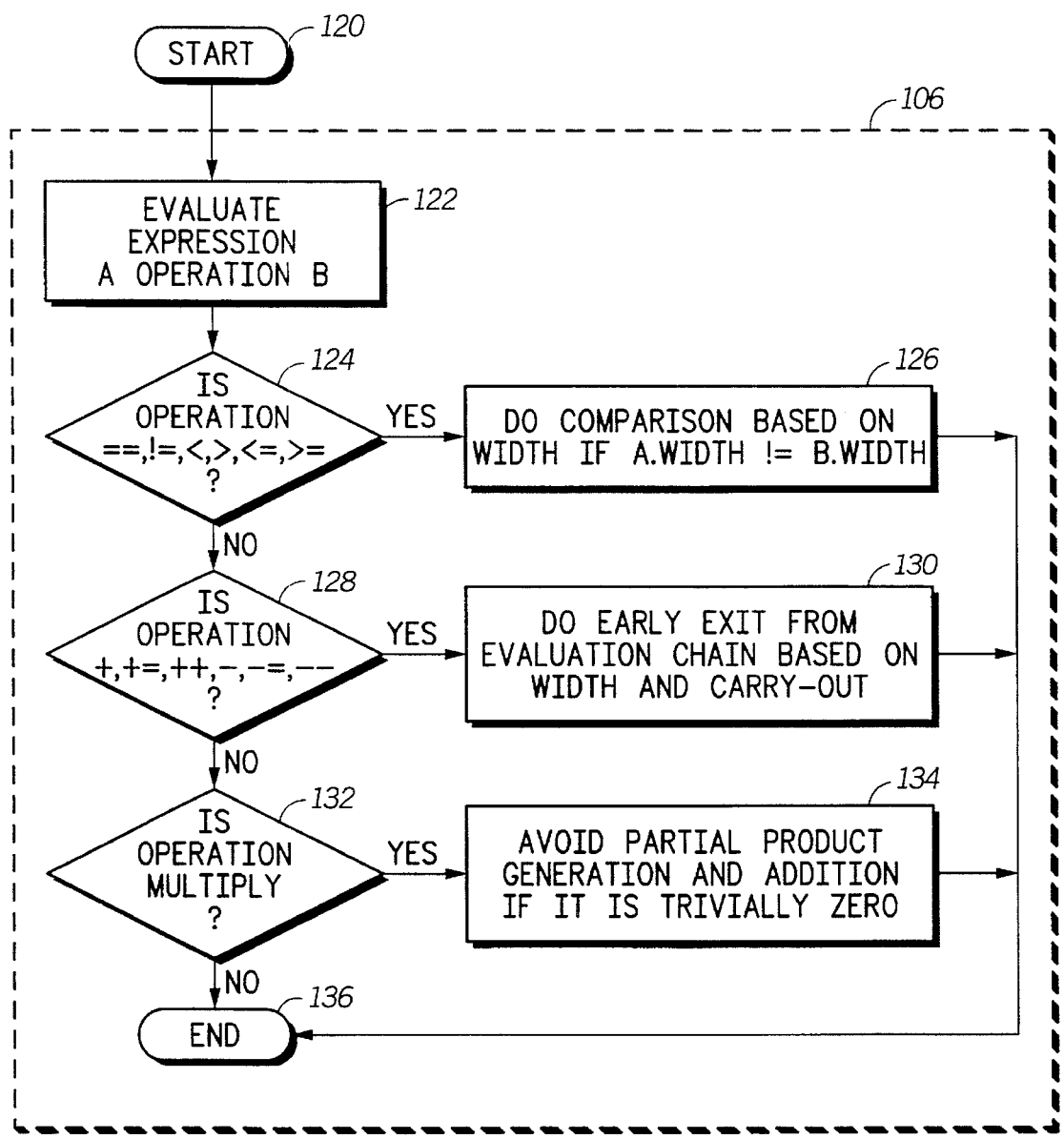
FIG. 8 illustrates, in a flowchart, an arbitrary precision number (APN) binary operation algorithm in accordance with the present invention.

FIG. 8 illustrates the flow of an algorithm for performing generic binary operations on arbitrary precision numbers (APNs). A step 120 begins the process for the "Generic Arbitrary precision Number Binary Operation Algorithm" procedure. A step 122 performs the "Algorithm for 'Lazy' Memory Allocation" procedure, which is described in more detail in FIG. 6. A step 124 checks whether the "lazy" evaluation can be used in performing numerical operations on arbitrary precision numbers (APNs). Lazy evaluation, as discussed above in FIG. 7, means that when large APN numbers are processed, short-cuts may be taken in the processing of mathematical operations to improve performance If "lazy" evaluation can be used in a step 124, then a step 126 will perform the "lazy" evaluation as appropriate for the arbitrary precision number (APN) operator (i.e., multiplication, addition, subtraction, comparison, etc.). The "lazy" evaluation process is illustrated in more detail in FIG. 7. After the "lazy" evaluation is performed on the arbitrary precision numbers in the step 126, then flow continues to a step 134.

A step 128 performs word-by-word evaluation on the operands if "lazy" evaluation can not be used in the step 124, which is described in the following manner (the following code example will be termed Example D):

Example D

Word-by-Word Evaluation Using Addition

```
                    word2    | word1
Carry Bit    =>              1 |
Operand One  =>     01001110| 10000000  width=15
Operand Two  =>     01000000| 10001111  width=15
                 + _____|_____
Result       =>     10001111| 00001111  width=16
```

In Example D, Operand One is an arbitrary precision number that has a decimal value of 20,096 and for this example, the machine word size is a maximum of eight bits. Therefore, Operand One must have two machine word data memory blocks in order to hold the sixteen bits, which represent the value of Operand One, for the binary value 0100111010000000 is equal to the decimal value of 20,096. An Operand Two in Example D, is an arbitrary precision number that has a decimal value of 16,527, and since the machine word size is a maximum of eight bits, only one machine word data memory block is needed to hold the four significant digits, for the binary value 0100000010001111 is equal to the decimal value of 16,527.

Also, in Example D, the result is an arbitrary precision number whose value is unknown until after the operation performed by Operand One and Operand Two are complete. To calculate the result in Example D, word-by-word arithmetic evaluation for addition is implemented. Operand Two in Example D, has a width of fifteen, therefore to calculate for word1 of Result in Example D, the first eight significant bits in word1 for Operand Two are added to the first eight significant bits in word 1 for Operand One and the result is stored in word1 of Result. However, a carry-out bit is produced and transferred to the word2 of Operand One. In order to calculate for word2 of Result in Example D, the first eight significant bits in word2 for Operand Two are added to the first eight significant bits in word2 (including any carry-out bit from word1 addition) for Operand One and the result is stored in word2 of result.

The word-by-word evaluation method could also be applied with other mathematical operations in the same manner as the word-by word evaluation for addition as described in the above Example D. In general, any number of words N may be calculated and the APN numbers may vary significantly in allocated size and precision.

A step 130 computes the width of the result calculated in the step 128. The width of the result is the number of bits of precision used to represent the result. The width is stored as a bit size and the size is stored as a number of words. The width of the result is calculated by dividing the number of bits used for storing the arbitrary precision number (APN) by the machine word memory block size. The arbitrary precision number program code 18 in FIG. 1 performs the calculation for the width of the result. A step 132 assigns the computed width calculated in the step 120 to the width data type 26 illustrated in FIG. 1, which is embedded within the arbitrary precision number data structure 16 in FIG. 1. A step 134 exits the "Generic Arbitrary Precision Number Binary Operation Algorithm" procedure.

While the present invention has been illustrated and described with reference to specific embodiments, further modifications and improvements will occur to those skilled in the art. For example, the arbitrary precision number (APN) data array 22 could be implemented using a dynamic data structure, pointers, to store the machine word memory blocks. Other conventional machine instructions or routines may be added to the arbitrary program code 18. It is understood, therefore, that it is intended in the appended claims to cover all modifications that do not depart from the spirit and scope of this invention.

I claim:

1. A method for preserving numerical precision of numbers within a data processing system wherein the data processing system has access to a memory storage unit having L total storage locations, the method comprising the steps of:

allocating a predetermined number M of storage locations within the memory storage unit to store an arbitrary precision number which is used by the data processing system, M being a finite positive integer less than L, the arbitrary precision number having a size storage location which stores the amount of storage locations M which are being used to represent the arbitrary precision number, the size storage location storing a value which is less than or equal to M, the value M and a width storage location which stores the number of bits used to represent the arbitrary precision number;

performing an operation on the arbitrary precision number to change the arbitrary precision number from a first value to a second value which is different from the first value, the second value requiring more numerical precision in order to maintain full precision than the first value;

expanding the number of storage locations M within the memory unit to a predetermined number N of storage locations via memory allocation wherein N is greater than M and allows the arbitrary precision number to maintain full precision, N being a finite positive integer less than or equal to L wherein a value less than or equal to N and greater than M is now stored in the size storage location;

performing another operation on the arbitrary precision number to change the arbitrary precision number from the second value to a third value which is different from the second value, the third value needing less numerical precision in order to maintain full precision than the second value;

reducing a numerical value in the size storage location to a value less than N while still keeping the N storage locations allocated to the arbitrary precision number.

2. The method of claim 1 further comprising the steps of:

performing an operation on the arbitrary precision number to change the arbitrary precision number from the second value to a third value wherein the third value requires less numerical precision in order to maintain full precision than the numerical precision of the second value;

reducing the number of storage locations N within the memory unit to a predetermined number K of storage locations wherein K is less than N but still allows the arbitrary precision number to maintain full precision, K being a finite positive integer less than L.

3. The method of claim 2 wherein the step of reducing the number of storage locations N within the memory unit to a predetermined number K of storage locations further comprises:

performing the step of reducing by executing a data processing system instruction within the data processing system, the data processing system instruction generating at least one control signal which allows the memory unit to reduce the number of storage locations N within the memory unit to a predetermined number K of storage locations in the memory unit.

4. The method of claim 1 further comprising:

storing in a memory location within the data processing system a value M of storage locations assigned to the arbitrary precision number.

5. The method of claim 4 wherein the step of storing in a memory location within the data processing system a value M of storage locations assigned to the arbitrary precision number further comprises:

updating the memory location within the data processing system which stores the value M of storage locations assigned to the arbitrary precision number when the value M of storage locations changes to another value not equal to M.

6. The method of claim 4 wherein the step of storing in a memory location within the data processing system a value M of storage locations assigned to the arbitrary precision number further comprises:

selectively writing the memory location within the data processing system to a value other than M in order to truncate a selected number of bits from the arbitrary precision number.

7. The method of claim 1 further comprising:

storing in a memory location within the data processing system a number of significant bits within the predetermined number M of storage locations used to represent the arbitrary precision number.

8. The method of claim 7 further comprising:

accessing the memory location used to store the number of significant bits used to represent the arbitrary precision number and using a value read from the memory location to speed mathematical processing of the arbitrary precision number.

9. The method of claim 1 wherein the step of expanding the number of storage locations M results in a arbitrary precision number having too many bits to be processed by hardware within the data processing system in a single memory access, the method further comprising the steeps of:

separating the arbitrary precision number into a plurality of segments; and processing one segment of the arbitrary precision number at a time using the hardware.

10. The method of claim 9 wherein the step of processing is repeated multiple times in order to process more the one segment of the arbitrary precision number.

11. The method of claim 1 wherein the step of expanding allows the arbitrary precision number to be expanded to a maximum virtual memory size which is defined to be equal to or greater than the maximum physical memory size of the memory unit.

12. The method of claim 1 further comprising a step of:

executing an instruction within the data processing system which results in the value of M being made available to an execution device within the data processing system.

13. The method of claim 1 further comprising a step of:

executing an instruction within the data processing system which returns, as a result, a number of least significant zeros present in the arbitrary precision number.

14. A data processing system comprising:

an execution device for controlling the operation of the data processing system;

a memory unit coupled to the execution device for storing numbers within the data processing system, each number stored within the memory unit initially being assigned a predetermined number of binary memory locations within the memory unit for storing a binary value;

a hardware operations unit for performing mathematical operations using the numbers stored within the data processing system, the mathematical operations performed by the hardware operations unit changing a number of significant bits of at least one number stored within the memory unit;

means for dynamically altering the size of the predetermined number of binary memory locations used by the at least one number stored within the memory unit, the means for dynamically altering the size of the predetermined number of binary memory locations allocating more memory to the predetermined number of binary memory locations in response to the precision of the at least one number increasing, the means for dynamically altering the size of the predetermined number of binary memory locations not decreasing the amount of memory allocated to the predetermined number of binary memory locations in response to the precision of the at least one number decreasing.

15. The data processing system of claim 14 wherein the means for dynamically altering may expand the size of the predetermined number of binary memory locations a plurality of times.

16. The data processing system of claim 14 wherein the means for dynamically altering may expand the size of the predetermined number of binary memory locations to include every binary memory location within the memory unit.

17. The data processing system of claim 14 wherein the execution device selectively executes an instruction which reduces the size of the predetermined number of binary memory locations to conserve memory.

18. The data processing system of claim 14 wherein the means for dynamically altering: (1) keeps track of the predetermined number of binary memory locations allocated to each number within the at least one number in one or more allocation fields; and (2) keeps track of the quantity of used memory locations among the predetermined number of binary memory locations for each number within the at least one number wherein the quantity of used memory locations is the amount of memory used, out of the predetermined number of binary memory locations, in order to represent each number of the at least one number with complete precision.

19. The data processing system of claim 14 wherein the execution device stores, in a storage location within the memory unit, the size of the predetermined number of binary memory locations used to represent the at least one number.

20. The data processing system of claim 19 wherein the execution device may either read or write the storage location within the memory unit which stores the size of the predetermined number of binary memory locations used to represent the at least one number.

21. The data processing system of claim 20 wherein the storage location stores a first numerical value and the execution device writes, to the storage location which stores the size of the predetermined number of binary memory locations used to represent the at least one number, a second numerical value which is less than the first numerical value in order to truncate at least one bit from the at least one number.

22. The data processing system of claim 14 wherein a storage location within the memory unit stores a number of significant bits needed to represent the at least one number.

23. The data processing system of claim 22 wherein the storage location within the memory unit which stores the number of significant bits needed to represent the at least one number is accessed by the execution device in order to speed a mathematical operation which uses the at least one number as an input operand, wherein the mathematical operation is performed by the execution device.

24. A method for preserving numerical precision of numbers within a data processing system wherein the data processing system has access to a memory storage unit having a plurality of storage locations, the method comprising the steps of:

assigning a first predetermined number of storage locations within the memory storage unit to store a system number which is used by the data processing system;

storing the first predetermined number in a first storage location within the memory storage unit to dynamically keep track of the number of storage locations assigned to the system number;

storing, in a second storage location of the memory storage unit, a number of significant bits required to precisely represent the system number in the memory storage unit;

performing an operation on the system number to change the system number from a first value to a second value which is different from the first value, the second value requiring less numerical precision than the first value in order to precisely represent the system number in the memory storage unit; and reducing a value stored in second storage location to indicate the lesser numerical precision while not reducing the amount of memory storage allocated to the system number and while maintaining the same value within the first storage location.

25. The method of claim 24 wherein the step of reducing further comprises:

reducing the first predetermined number in a first storage location assigned to the system number in response to an instruction from a client program.

* * * * *